United States Patent [19]
Meister

[11] Patent Number: 5,485,041
[45] Date of Patent: Jan. 16, 1996

[54] IMPACT SENSOR FOR VEHICLE SAFETY RESTRAINT SYSTEM

[76] Inventor: Jack B. Meister, 68 Chimney Ridge Rd., P.O. Box 216, Convent Station, N.J. 07961

[21] Appl. No.: 142,045

[22] Filed: Oct. 28, 1993

Related U.S. Application Data

[63] Continuation-in-part of Ser. No. 950,315, Sep. 24, 1992, Pat. No. 5,430,334, which is a continuation-in-part of Ser. No. 615,074, Nov. 19, 1990, Pat. No. 5,177,370.

[51] Int. Cl.$^6$ .................................... H01H 35/14
[52] U.S. Cl. ................ 307/10.1; 73/514.35; 73/514.38; 180/282; 200/61.45 M; 200/61.53; 280/735; 340/436; 307/121
[58] Field of Search ................... 307/10.1, 121; 180/282; 280/735; 340/436, 669; 200/61.45 R, 61.45 M, 61.53; 73/1 D, 652, 649, 510, 514, 517 R, 518, 519, 520

[56] References Cited

U.S. PATENT DOCUMENTS

| | | | |
|---|---|---|---|
| 3,889,130 | 6/1975 | Breed | 307/121 |
| 4,281,245 | 7/1981 | Brogardh et al. | 250/205 |
| 4,329,549 | 5/1982 | Breed | 200/61.45 M |
| 4,484,041 | 11/1984 | Andres et al. | 200/61.45 M |
| 4,494,712 | 1/1985 | Godwin, Jr. et al. | 360/71 |
| 4,508,280 | 4/1985 | Hayosh et al. | 360/71 |
| 4,609,059 | 9/1986 | Pasterkamp | 177/50 |
| 4,639,563 | 1/1987 | Günther | 200/61.45 M |
| 4,743,780 | 5/1988 | Opie | 307/106 |
| 4,827,091 | 5/1989 | Behr | 200/61.45 M |
| 4,922,065 | 5/1990 | Behr et al. | 200/61.45 M |
| 4,965,416 | 10/1990 | Bachmann | 200/61.45 M |
| 4,980,526 | 12/1990 | Reneau | 200/61.45 M |
| 5,032,696 | 6/1991 | Peterson | 200/61.45 M |
| 5,072,181 | 12/1991 | Burger | 324/207.25 |
| 5,149,925 | 9/1992 | Behr et al. | 200/61.45 M |
| 5,177,370 | 1/1993 | Meister | 180/282 |
| 5,374,793 | 12/1994 | Shimozono et al. | 200/61.45 M |

Primary Examiner—William M. Shoop, Jr.
Assistant Examiner—Richard T. Elms
Attorney, Agent, or Firm—Barnes, Kisselle, Raisch, Choate, Wittemore & Hulbert

[57] ABSTRACT

An acceleration sensor that includes a permanent magnet mounted for movement within a cylindrical cavity in a body of non-magnetic material. The magnet has a cylindrical geometry and an outer surface with a first portion of electrically conductive construction entirely around the magnet adjacent to one axial end thereof, and a second portion of electrically non-conductive construction entirely around the magnet adjacent to an opposing end thereof. A pair of diametrically opposed electrical contact leaves extend through openings into resilient sliding contact with the magnet. The magnet is resiliently urged toward one end of the cavity such that the contacts are in engagement with one of the first and second surface portions. Acceleration forces on the magnet move the magnet toward the opposing end of the cavity, bringing the contacts into engagement with the other of the first and second surface portions, such that motion of the magnet within the cavity results in a change in electrical conductance between the contacts.

5 Claims, 2 Drawing Sheets

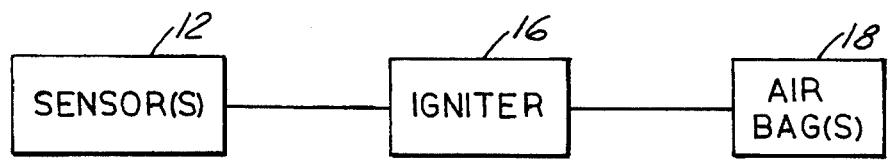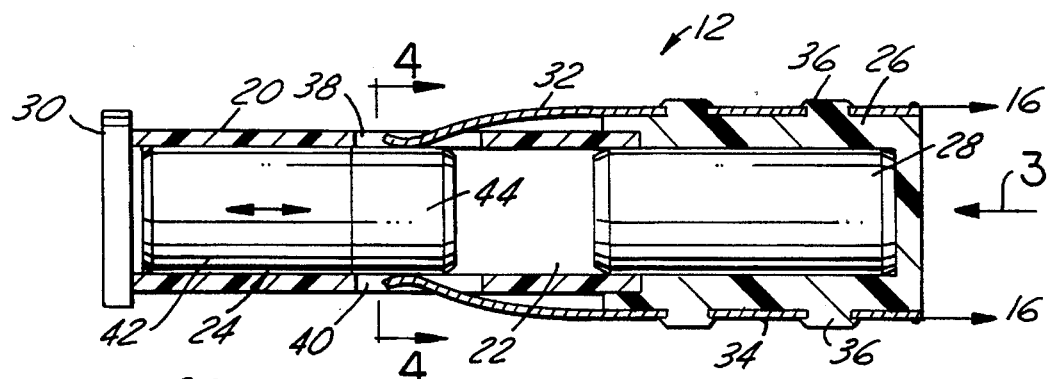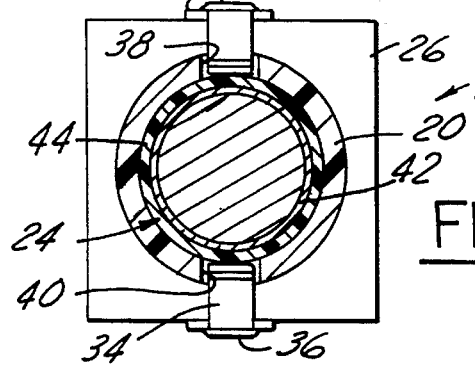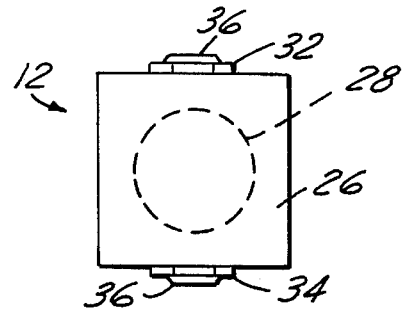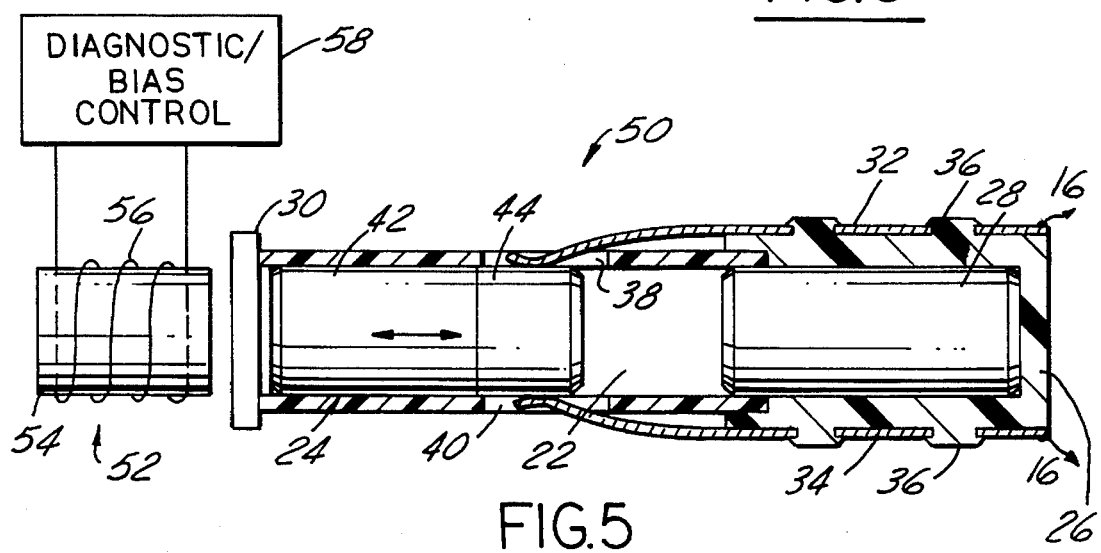

IMPACT SENSOR FOR VEHICLE SAFETY RESTRAINT SYSTEM

This application is a continuation-in-part of application Ser. No. 07/950,315 filed Sep. 24, 1992, now U.S. Pat. No. 5,430,334, which is a continuation-in-part of application Ser. No. 07/615,074 filed Nov. 19, 1990 and now U.S. Pat. No. 5,177,370.

The present invention is directed to an acceleration sensor having particular utility as an impact sensor for activating safety restraints, such as an air bag, in an automotive vehicle. In this connection, the term "acceleration" as employed in this application specifically includes both positive and negative acceleration—e.g., severe deceleration caused by impact of a vehicle.

Background and Objects of the Invention

A number of impact sensors have heretofore been proposed for activating vehicle restraint systems and other similar applications. For example, U.S. Pat. No. 4,329,549 discloses a sensor in which a spherical ball is biased toward one end of a cavity by a permanent magnet positioned externally of the cavity. Severe deceleration of a vehicle, on which the sensor is mounted and appropriately oriented, exerts sufficient force on the ball to overcome the force of attraction to the magnet, and to propel the ball longitudinally through the cavity against a pair of switch contacts. The switch contacts are connected to suitable devices for inflating an air bag or the like to prevent impact of a vehicle occupant against the steering wheel or dashboard.

A disadvantage of this design is that closely controlled tolerances are required between the ball and the surrounding cavity, which are difficult and expensive to control in manufacture. Furthermore, the ball must be sufficiently large to generate reliable contact force against the switch elements, necessitating use of a large magnet and consequently decreasing responsiveness of the sensor to impact forces. Weight of the ball may be reduced by plating the switch contacts with gold or the like, increasing the cost of manufacture. Dust particles and the like decrease reliability of the mechanical switch contacts. Additionally, the sensor disclosed in this patent is not well adapted to respond to impacts from all directions, necessitating use of more than one sensor in automotive applications.

U.S. Pat. No. 4,827,091 discloses an impact sensor in which a permanent magnet is longitudinally movable within a cavity of a non-magnetic body. The magnet is biased toward one end of the cavity by magnetic attraction to a ring positioned externally of the cavity. Electrical switch contacts are positioned at the opposing end of the cavity for abutting electrical and mechanical engagement with the magnet. U.S. Pat. No. 4,484,041 discloses an impact sensor in which a permanent magnet is movably mounted within a cavity of a non-magnetic body, and normally held by magnet attraction against a magnetically permeable element that closes one end of the cavity. Application of acceleration forces to the body sufficient to overcome the force of magnetic attraction propels the magnet against a spring at the opposing end of the cavity, which returns the magnet to its normal position when the acceleration forces are removed. A reed switch is positioned adjacent to the cavity to detect motion of the magnet against the spring.

U.S. Pat. No. 4,639,563 discloses a sensor in which a pair of magnets are movably mounted within the cavity of a nonmagnetic body and oriented such that like poles on the magnets are opposed to each other and hold the magnets against opposing ends of the cavity. A reed switch is positioned adjacent to the cavity and generates an output signal when acceleration forces on either magnet are sufficient to overcome the force of magnetic repulsion and move the magnet toward the center of the cavity.

U.S. Pat. No. 5,177,370 discloses an acceleration sensor that comprises a body of non-magnetic construction having a linear internal cavity of uniform circular cross section. At least one permanent magnet is movably mounted within the cavity, and is resiliently urged toward one end of the cavity in such a way that acceleration forces on the sensor move the magnet toward the opposing end of the cavity. At least one Wiegand wire is positioned externally of the cavity between the cavity ends. The Wiegand wire is characterized by two stable magnetic flux-generating states dependent upon application of an external magnetic field of appropriate polarity for switching between such states. An electrical coil is positioned adjacent to the Wiegand wire, and is responsive to switching between the two flux-generating states for generating a sensor output signal as a result of acceleration forces on the magnet sufficient to overcome the force urging the magnet toward the one cavity end, and thus to bring the magnet into proximity with the Wiegand wire.

A general object of the present invention is to provide an acceleration sensor that has particular utility as an impact sensor for activating a vehicle restraint system, that is compact and rugged in construction, that is reliable in operation, and that can be produced at relatively low cost employing conventional manufacturing technology. Yet another object of the present invention is to provide a vehicle restraint system that employs such a sensor.

Summary of the Invention

An acceleration sensor that finds particular utility as an impact sensor in a vehicle restraint system in accordance with the present invention includes a permanent magnet mounted for movement within a cavity in a body of non-magnetic construction between at least first and second positions spaced from each other longitudinally of the cavity. The magnet is resiliently urged to the first position adjacent to one end of the cavity in such a way that acceleration forces on the magnet urge the magnet toward the second position against the forces resiliently applied to the magnet. Electrical switch contacts extend into the cavity into surface engagement with the magnet. The magnet surface has a first zone of electrically conductive construction and a second zone of electrically non-conductive construction adjacent to the respective ends thereof. The conductive and non-conductive zones are spaced from each other such that the switch contacts engage one of the zones in the first position of the magnet, and engage the other of the zones in the second position of the magnet. In this way, a change in electrical conductivity between the switch contacts indicates motion of the magnet from the first to the second position.

In the preferred embodiment of the invention, the magnet and cavity are of cylindrical construction. The conductive zone on the magnet surface is formed by a layer of electrically conductive material that entirely surrounds the magnet adjacent to one end thereof, and the second zone of electrically non-conductive construction is formed by a layer of insulating material entirely surrounding the magnet adjacent to the opposing end thereof. Most preferably, the insulating layer is of low-friction composition such as Teflon (trademark) for reducing friction between the magnet and the opposing wall of the cavity. The electrical contacts comprise leaf spring contacts that are cantilevered from the body externally of the cavity, and have free ends that extend through diametrically opposed slots into sliding contact with the magnet in the cavity. Contact forces applied by the leaf contacts to the magnet are balanced radially of the cavity. The low-friction insulating layer both enhances sliding of the magnet within the cavity and reduces sliding friction between the magnet and the leaf contacts. A coil spring may be disposed within the cavity in engagement with the magnet to help overcome any residual sliding friction between the magnet and the leaf contacts.

The sensor magnet is resiliently urged to one end of the cavity in the preferred embodiment of the invention by a second magnet of opposite polarity disposed within the cavity adjacent to the opposing end thereof, and by a plate of magnetically permeable material disposed adjacent to the first magnet. The second magnet may be either fixed or movable within the cavity. Most preferably, forces of magnet attraction/repulsion applied to the first magnet by the second magnet and the magnetically permeable plate are such that magnet forces on the first magnet remain substantially constant during motion of the magnet between the first and second positions. Sensitivity of the sensor may be selectively adjusted by varying the biasing force on the first magnet.

For this purpose, an electromagnet may be positioned adjacent to the cavity and coupled to electronic circuitry for selectively varying force of attraction/repulsion of the electromagnet on the first magnet within the cavity. Operative condition of the sensor may also be tested by applying a signal to the electromagnet for urging the permanent magnet within the cavity toward its second or sensing position.

BRIEF DESCRIPTION OF THE DRAWINGS

The invention, together with additional objects, features and advantages thereof, will be best understood from the following description, the appended claims and the accompanying drawings in which:

FIG. 1 is a functional block diagram of a vehicle safety restraint system in accordance with one presently preferred implementation of the invention;

FIG. 2 is a sectional view in side elevation of an impact sensor in accordance with one presently preferred embodiment of the invention;

FIG. 3 is an end view taken substantially in the direction 3 in FIG. 2;

FIG. 4 is a sectional view taken substantially along the line 4—4 in FIG. 2; and FIGS. 5–6 are sectional views similar to that of FIG. 2 illustrating respective modified embodiments of the invention.

DETAILED DESCRIPTION OF THE PREFERRED EMBODIMENTS

Figure 6:
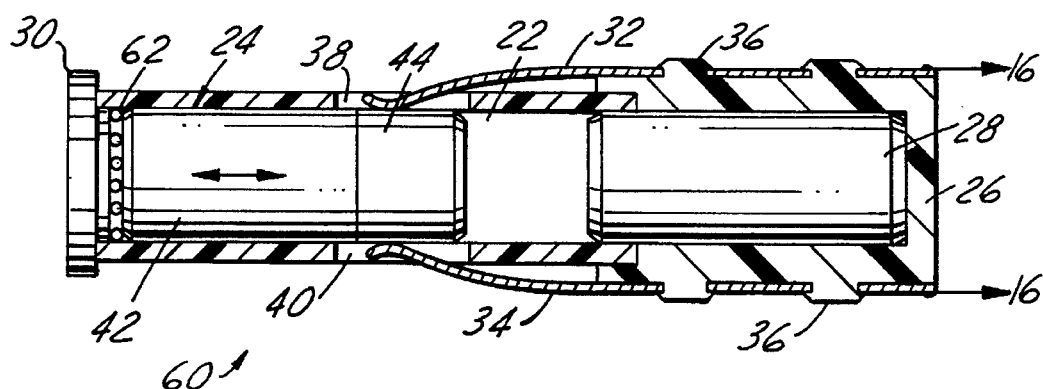

FIG. 1 illustrates a vehicle restraint system 10 in which one or more impact sensors 12 provide output signals to an igniter 16 indicative of rapid deceleration of the vehicle caused by impact from one or more directions. Igniter 16 in turn initiates a chemical reaction for rapidly inflating one or more vehicle restraint air bags 18.

FIGS. 2–4 illustrate a sensor 12 in accordance with a presently preferred embodiment of the invention as comprising a tubular body 20 of plastic or other suitable non-magnetic material. Tubular body 20 has a cylindrical internal cavity 22 in which a cylindrical permanent magnet 24 is axially slidably disposed. A cap 26 of plastic or other suitable non-magnetic material closes one end of tubular body 20, and embraces a permanent magnet 28 that is held by cap 26 in fixed position adjacent to one end of cavity 22 within body 20. The opposing end of cavity 22 is closed by a cap 30 of magnetically permeable material. Magnets 24,28 have like poles opposed to each other, so that magnet 24 is resiliently urged to the position illustrated in FIG. 2 by the combined effects of magnetic repulsion from magnet 28 and magnetic attraction to cap 30. Forces of rapid deceleration on magnet 24 overcome such biasing forces, and urge magnet 24 to the right in FIG. 2. Preferably, the forces of magnetic repulsion/attraction on magnet 24 remain substantially constant independent of position of magnet 24 within cavity 22.

A pair of electrically conductive leaf contacts 32,34 are externally mounted on diametrically opposed sides of body cap 26 by means of heads 36, integral with cap 26, that extend through and capture spaced openings on the respective contact leaves. Contacts 32,34 are cantilevered from cap 26, with the free ends extending through diametrically opposed slots 38,40 into sliding engagement with the external surface of magnet 24. The free ends of leaf contacts 32,34 are radiused as shown in FIG. 2, and are resiliently held against magnet 24 by internal leaf-spring forces within the contacts. Magnet 24 has a thin coating 42 of electrically conductive construction, such as gold, that extends end-to-end entirely around the cylindrical outer surface of the magnet. The end of magnet 24 adjacent to magnet 28 is over-coated by a layer 44 of electrically non-conductive construction, preferably a low-friction insulating material such as Teflon (trademark).

There are thus provided spaced zones or portions on the outer surface of magnet 24 of electrically conductive and non-conductive construction. Leaf contacts 32,34 engage the zone adjacent to magnet 28—i.e., non-conductive zone 44—in the normal or non-energized state of sensor 12 as shown in FIGS. 2–4. When deceleration forces on magnet 24 move the same to the right in FIG. 2, contacts 32,34 are brought into sliding engagement with electrically conductive surface portion 42, thereby altering or switching the conductive condition between the contacts. Such change in conductive condition is sensed by electronic interface 14 (FIG. 1) to activate igniter 16 and fill air bags 18. Provision of non-conductive zone 44 in the form of a low-friction coating reduces sliding friction between magnet 24 and tubular body 20, and thereby enhances sensitivity of sensor 12. Lateral forces applied to magnet 24 by leaf contacts 32,34 are balanced, so that magnet 24 is not urged into frictional engagement with the surrounding cavity wall.

FIG. 5 illustrates a modified sensor 50, in which reference numerals identical to those employed in FIGS. 2–4 indicate correspondingly identical elements. In sensor 50, an electromagnet 52 is disposed externally of cavity 22 adjacent to magnetically permeable cap 30. Electromagnet 52 comprises a core 54 and an electrical coil 56 connected to diagnostic/bias control electronics 58. As disclosed in greater detail in parent application Ser. No. 07/950,315, electromagnet 52 may be controlled by electronics 58 selectively to increase or decrease biasing forces applied to magnet 24 by magnet 28 and cap 30, and thereby adjust sensitivity of sensor 50 to external acceleration/deceleration forces. Electronics 58 may also energize electromagnet 52 to urge magnet 24 to the right in FIG. 5 so as to bring magnet conductive zone 42 into engagement with leaf contacts 32,34, and thereby test operation of sensor 50. Reference is made to parent application Ser. No. 07/950,315 for a more detailed discussion of such diagnostic/bias control feature.

FIG. 6 illustrates another modified sensor 60, in which like reference numerals are again employed to indicate like elements. In sensor 60, a conical coil spring 62 is disposed between magnet 24 and cap 30. In the normal condition of sensor 60 illustrated in FIG. 6, coil spring 62 is fully compressed, and exerts a small force on magnet 24 urging the magnet to the right. Coil spring 62 helps overcome the initial frictional forces of contacts 32,34 against the outer surface of magnet 24.

I claim:

1. An acceleration sensor that comprises:

a body of non-magnetic material having an internal cylindrical cavity and a pair of diametrically opposed openings that open radially into said cavity, a permanent magnet mounted for sliding movement within said cavity axially of said cavity, said permanent magnet having a cylindrical geometry and a radially outwardly facing surface with a first portion of electrically conductive construction circumferentially entirely around said surface adjacent to one axial end of said magnet and a second portion composed of a layer of low-friction electrical insulating material that extends entirely circumferentially around said magnet surface adjacent to an opposing end of said magnet, a pair of electrical contact leaves externally mounted on said body on diametrically opposed sides thereof, said contact leaves having respective cantilevered free ends that extend through said diametrically opposed openings into resilient sliding contact with diametrically opposed sides of said magnet surface, and means magnetically urging said magnet toward one end of said cavity such that said contact leaf free ends are in external contact with one of said first and second surface portions of said magnet on diametrically opposed sides thereof, acceleration forces on said magnet moving said magnet axially toward an opposing end of said cavity bringing said contact leaf ends into external sliding contact with the other of said first and second portions such that motion of said magnet within said cavity results in a change in electrical conductance between said contact leaves, lengths of said magnet and said cavity being such that said contact leaves remain in sliding contact with said magnet surface at all times during motion of said magnet within said cavity, said layer of low-friction insulating material on said radially outwardly facing surface of said magnet functioning both to insulate said contact leaves from electrically conductive contact with said magnet surface and to reduce sliding friction of said magnet within said cavity.

2. The sensor set forth in claim 1 wherein said magnet surface further comprises a layer of electrically conductive material on said surface forming said first surface portion.

3. The sensor set forth in claim 1 wherein said layer of electrically conductive construction extends axially and circumferentially along the entire radially outwardly facing surface of said magnet, and said layer of low-friction insulating material is disposed over said layer of electrically conductive construction adjacent to said opposing end of said magnet.

4. The sensor set forth in claim 1 further comprising spring means disposed within said cavity urging said magnet toward said opposing end of said cavity against forces applied to said magnet by said magnetically urging means.

5. The sensor set forth in claim 4 wherein said spring means comprises a conical coil spring.

\* \* \* \* \*